United States Patent [19]

Fourrey

[11] Patent Number: 4,598,950
[45] Date of Patent: Jul. 8, 1986

[54] TUBULAR REINFORCEMENT IN PARTICULAR FOR A MOTOR VEHICLE SEAT

[75] Inventor: François Fourrey, Montbeliard, France

[73] Assignee: Cycles Peugeot, Valentigney, France

[21] Appl. No.: 584,563

[22] Filed: Feb. 29, 1984

[30] Foreign Application Priority Data

Mar. 1, 1983 [FR] France ................. 83 03340

[51] Int. Cl.⁴ ............................................. B60R 21/00
[52] U.S. Cl. ..................................... 297/452; 297/216
[58] Field of Search ..................... 297/216, 452; 248/188.1; 83/54, 660, 684, 697; 72/324, 338, 326, 332

[56] References Cited

U.S. PATENT DOCUMENTS

| 518,766 | 4/1894 | Plecker | 72/326 |
|---|---|---|---|
| 3,147,998 | 9/1964 | Hamilton | 297/452 |
| 3,178,806 | 4/1965 | Keith | 72/326 X |
| 3,544,164 | 12/1970 | Ohta | 297/216 |
| 3,747,450 | 7/1973 | Hudson | 83/54 X |

FOREIGN PATENT DOCUMENTS

| 2141767 | 2/1972 | Fed. Rep. of Germany | 83/54 |
|---|---|---|---|
| 48307 | 7/1983 | Japan | 83/54 |

*Primary Examiner*—James T. McCall
*Attorney, Agent, or Firm*—Sughrue, Mion, Zinn, Macpeak and Seas

[57] ABSTRACT

This reinforcement has at least one elongated slit 12 formed in the wall of the tube 1 located inside the reinforcement and therefore little exposed to impacts. The slit 12 is formed by a punching operation by urging back the material toward the interior of the tube and rolling it in the form of two curls in opposite directions. Upon impact, the reinforcement is progressively deformed in the region of the slit and thus absorbs the energy of the impact.

5 Claims, 5 Drawing Figures

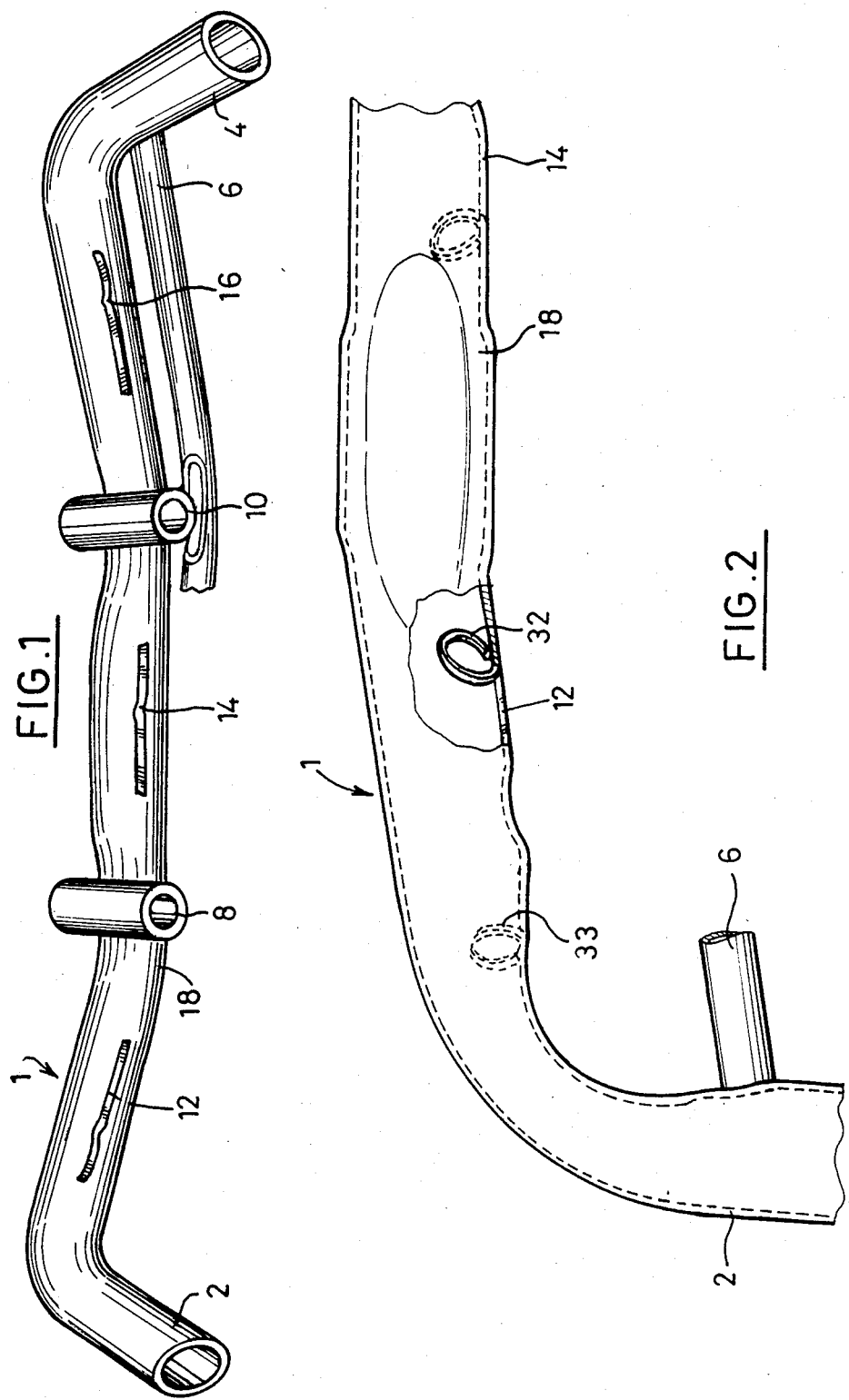

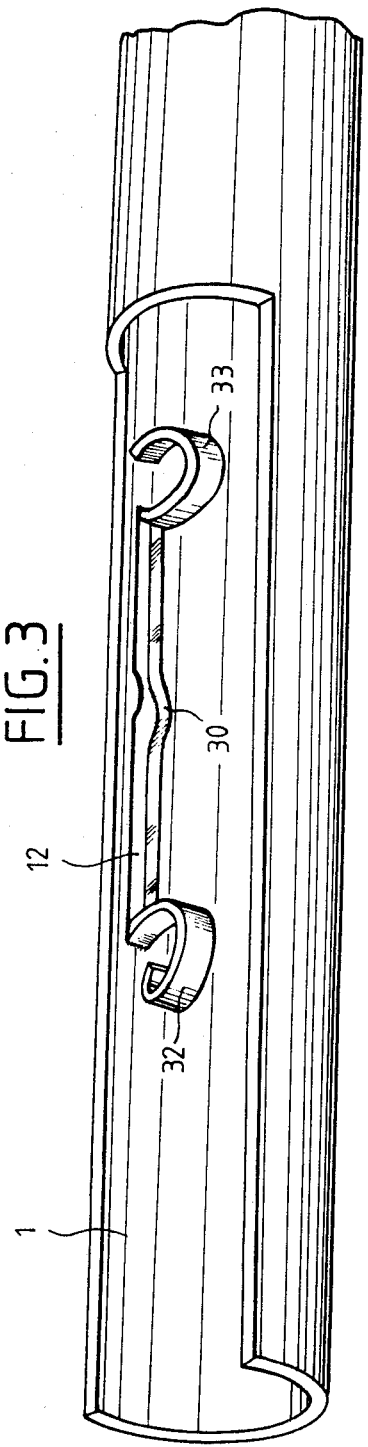
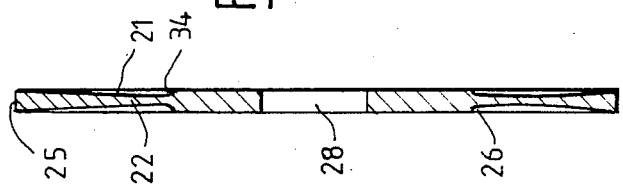
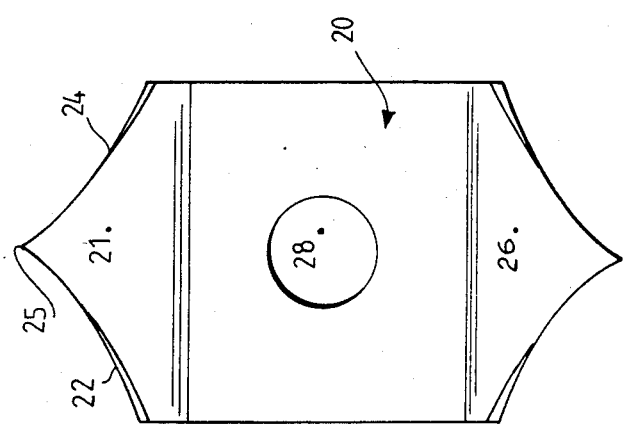

TUBULAR REINFORCEMENT IN PARTICULAR FOR A MOTOR VEHICLE SEAT

Tubular reinforcements are known and appreciated for their stiffness and strength. This is why they are increasingly employed, in particular for motor vehicle seats or the like.

Vehicle seat reinforcements must indeed have great stiffness so as to be able to absorb various mechanical stresses, such as the pressure exerted by the body of the driver, pulling or pushing on the seat back by the rear passenger, or even, in some cases, thrust exerted by the lumbar part of the driver or front passenger for the purpose of adjusting the inclination of the seat back which very highly stresses the structure of the latter. However, these reinforcements must also withstand brutal forces such as a sudden braking or a collision and, in this case, they must not have an excessive stiffness so as to avoid constituting a danger for the occupants, in particular in the upper part of the seat in the region of the nape of the neck of the front passenger.

Therefore an object of the invention is to provide a reinforcement which satisfies these apparently contradictory requirements.

The invention therefore provides a tubular reinforcement which comprises, in the part thereof exposed to impacts and blows, at least one longitudinal and narrow slit formed in the wall of the tube facing toward the interior of the reinforcement.

According to a preferred embodiment, each slit is obtained by a punching operation which urges back the material laterally inwardly.

Owing to this arrangement, the tubular reinforcement can be progressively deformed under the action of an impact or blow and absorb this impact without producing a projection or other dangerous element but retains sufficient stiffness in regard to other stresses.

Preferably, the reinforcement has a plurality of slits. For example, a seat reinforcement has, in the upper part of the seat back, three aligned slits separated by closed portions of great stiffness.

The invention also embraces a tube for forming an incision in a tube forming the reinforcement. This tool as formed by a flat blade at least one of the ends of which forms a point between two concave edges in the shape of an arc of a circle for progressively laterally rolling up the punched material.

The slit or incision is thus formed without removing material or producing sharp projections since the cut material rolls into a loop inside the tube.

The following description of one embodiment which is given merely by way of example and shown in the accompanying drawings will bring out the advantages and features of the invention.

In the drawings:

FIG. 1 is a perspective view of the upper part of the reinforcement of the seat back of a vehicle seat laid flat;

FIG. 2 is a partial plan view of the part of the reinforcement of FIG. 1 to an enlarged scale;

FIG. 3 is a cut-away view of a reinforcement portion according to invention;

FIG. 4 is a plan view of a tool for forming an incision in the the reinforcement, and FIG. 5 is a sectional view of the tool shown in FIG. 4.

The reinforcement portion shown in FIGS. 1 and 2 forms the upper part of a seat back and consists of a tube 1 which has a transverse portion substantially rectilinear extends transversely of the seat back and which is bent at its two ends so as to form two uprights 2 and 4 respectively. Cross-members, such as that shown partly at 6, preferably interconnect the uprights 2 and 4 and sleeves 8, 10 fixed transversely of the tube 1 permit the attachment of springs or the like for supporting the user.

Between the sleeves 8, 10, and even on each side of the latter, the transverse portion of the tube 1 has longitudinal slits 12, 14, 16 which are narrow and extend throughout the thickness of the wall of the tube facing toward the interior of the reinforcement, i.e. toward the cross-member 6. The slits 12, 14, 16 are substantially in alignment with one another and are substantially identical, but they are spaced apart by closed portions 18, such as those formed by the unslit tube portions which support the sleeves 8 and 10. The length of each slit is preferably less than the distance therebetween and the neighbouring slit, i.e. less than the length of the intermediate closed portion 18. In the case of the illustrated vehicle seat reinforcement, each slit 12, 14, 16 has, for example, a length of the order of 5 to 6 cm while the closed portion 18 has a about 10 cm.

The slits are formed preferably by a punching operation so that their edges are slightly urged toward the interior of the tube and constitute no sharp projection liable to constitute a danger for the user.

In a preferred embodiment, this punching operation is carried out by means of a flat tool or blade 20 (FIGS. 4 and 5) which is extended by a point 21 defined by two edges which are curved in the shape of an arc of a circle and are slightly concave, 22, 24, and are joined at a sharp edge or corner 25. According to the embodiment shown in FIG. 4, the blade 20 is reversible and has a second point 26 identical to the first-mentioned point at its opposite end. An aperture 28 formed in its central part enables it to be gripped in a suitable control means.

When the blade 20 is urged into the tube 1, the point 25 slightly urges back the metal toward the interior of the tube at 30 and perforates it (FIG. 3), then, as the blade 20 enters the tube, the curved edges 22 and 24 cut away shavings of metal and urge them laterally into the interior of the tube by rolling them into curls 32, 33 at each end of the slit as shown in FIG. 3. It is unnecessary to remove the shavings formed in this way and the tool may merely be withdrawn by shifting it in the opposite direction. The slit has no sharp projection on the outer surface of the tube.

Preferably, and as shown in FIG. 5, the point 21 or 26 has a rake 34 which reduces the thickness at its junction with the blade proper. The withdrawal of the blade from the slit just formed is consequently achieved with a minimum of friction.

It will be understood that the presence of the slits reduces the stiffness of the tube and allows a localized mechanical deformation thereof. However, owing to the position of these slits on the inner side of the tube, i.e. on the side the least exposed to impacts or other stresses, this deformation is gradual and never results in dangerous projections. A sudden and brutal impact, whether it comes from the rear and is due for example to the forward projection of the rear passenger, or from the front and is produced by the held of the user of the seat, is practically always received by the tube 1 at a point diametrically opposed to the slit, or relatively remote from the latter. Consequently, depending on the position of the point of impact relative to the central point 30 of this slit, and the magnitude of this impact, the edges of the central portion of the slit separate or the end of the slit is progressively closed.

Such a deformation absorbs the energy of the impact and prevents its transmission to the user or to another passenger.

On the other hand, in normal use, the collapse of the tube due to the slits is insufficient to prevent the reinforcement from resisting the usual mechanical stresses. It has indeed been found that, notwithstanding the existence of the slits, the reinforcement retains the required stiffness and that the unslit portions which are between the slits easily satisfy the requirements of the very great stiffness required by regulations.

The capacity of localized mechanical deformation of the tube under the effect of an impact, added to the reinforcement, therefore does not adversely affect its features of stiffness but enables it to be reliable and even protective for the user.

It just be understood that the invention is not intended to be limited to motor vehicle seat reinforcements but embraces all reinforcements or the like which must have great stiffness and must also be capable of absorbing possible impacts.

What is claimed is:

1. A reinforcement, in particular for a motor vehicle seat, said reinforcement comprising an assembly of tubes defining an interior part of the reinforcement and, in a tube portion of said tubes which is exposed to impacts, means for rendering said tube portion more deformable in cross section when subjected to impact in a direction substantially toward said interior part of the reinforcement, said means consisting of at least one elongated, narrow and empty slit provided in a wall of said tube portion, extending longitudinally of said tube portion and facing said interior part of the reinforcement.

2. A reinforcement according to claim 1, wherein said tube portion has a substantially circular cross-sectional shape.

3. A reinforcement according to claim 2, wherein said slit is formed by a punching operation so that the punched material is rolled back at each end of the slit longitudinally of said tube portion.

4. A reinforcement according to claim 1, for a seat having a seat back, the reinforcement comprising, in an upper part of the seat back, three of said slits which are provided in said tube portion in alignment with one another longitudinally of said tube portion and separated by very rigid unslit portions of said tube portion.

5. A reinforcement according to claim 4, wherein the unslit portions of said tube portion between the slits are longer than the slits.

* * * * *